United States Patent [19]

Moser et al.

[11] 4,371,333
[45] Feb. 1, 1983

[54] DEVICE AND PROCESS FOR OPERATING AN OPEN BAKING FURNACE FOR MANUFACTURING CARBON-BEARING, SHAPED BODIES

[75] Inventors: Robert Moser, Steg, Switzerland; Gottfried Jungblut, Wehr, Fed. Rep. of Germany

[73] Assignee: Swiss Aluminium Ltd., Chippis, Switzerland

[21] Appl. No.: 290,755

[22] Filed: Aug. 7, 1981

[30] Foreign Application Priority Data

Aug. 15, 1980 [CH] Switzerland .................... 6165/80

[51] Int. Cl.³ .................... F27D 1/16; F27B 7/00
[52] U.S. Cl. .................... 432/3; 432/192; 432/193; 432/194
[58] Field of Search .................... 432/1, 3, 192, 193, 432/194

[56] References Cited

U.S. PATENT DOCUMENTS 1,133,582 3/1915 Shaw .................... 432/192
4,253,823 3/1981 Holdner .................... 432/192

Primary Examiner—John J. Camby
Attorney, Agent, or Firm—Bachman and LaPointe

[57] ABSTRACT

Device and process for operation of open baking furnaces, in particular such ring-type furnaces for manufacturing anodes for the aluminum electrolytic process, are such that for each so called fire the sealing chamber and/or chamber in the cooling zone can be saved in that the flue gas exhaust manifold is not situated on the headwall but instead on the flue and/or the opening of that headwall on which the last fresh air supply manifold is situated is closed off by a sliding baffle. Openings corresponding in cross section to that of the connected part of the flue gas exhaust manifold are provided in the region of the flues.

The advantage of the process lies in the greater flexibility in furnace operation, which results either in an increase in production or an increase in product quality.

10 Claims, 2 Drawing Figures

DEVICE AND PROCESS FOR OPERATING AN OPEN BAKING FURNACE FOR MANUFACTURING CARBON-BEARING, SHAPED BODIES

BACKGROUND OF THE INVENTION

The invention relates to a process and device for operating open baking furnaces, in particular open ring-type furnaces for manufacturing carbon-bearing, shaped bodies, especially electrodes for the Hall-Héroult fused salt electrolytic process for the production of aluminum.

The carbon-bearing bodies are usually produced from a mass of petroleum coke, anthracite, carbon black, graphite or the like mixed with a binding agent such as tar and/or pitch. On baking such bodies the binder is coked thereby producing the required mechanical and electrical properties.

This is the procedure used in particular with open ring-type furnaces to manufacture anodes for the aluminum fused salt electrolytic process.

The open baking furnace comprises a series of stationary baking chambers arranged in line next to each other. These chambers are separated from each other by headwalls running perpendicular to the direction of the series of chambers subdivided into pits and by flues running in the direction of the series of chambers.

By parallel arrangement of two rows of chambers and bridging over both flue systems, a ring-type of arrangement is obtained with the flues.

The charge, e.g. anodes for the aluminum fused salt electrolytic process, is introduced into the pits. In order to prevent fusing together and deformation of the anodes, and further to prevent the charge from burning away in the upper temperature range of the baking process an atmosphere which is as non-oxidizing as possible is provided by embedding the anodes completely in a packing powder of petroleum coke, metallurgical coke, anthracite or the like. This ensures that the anodes do not come in contact with each other, the flue walls or the floor.

The baking of the anodes takes place indirectly by heating the flues by means of external mobile burners. During the baking process, a plurality of chambers taken together form a so-called fire (German=Brandzug) in which the whole baking cycle takes place; these are connected up via a flue gas exhaust manifold to the flue ring main which as a rule circumvents the whole furnace. The number of chambers forming a fire depends on the geometry of the pits and flues and on the way the baking is carried out. The number of fires on the other hand depends on the size of the furnace i.e. on the number of chambers.

In general a fire comprises a sealing chamber, a pre-heating zone, a heating zone, each zone having about three chambers, and a cooling zone of about six chambers.

In the pre-heating zone the combustion gases are passed through the chambers filled with anodes which have not yet been baked, and then passed on to the flue ring main via the flue gas exhaust manifold.

Due to the flue gas exhaust manifold being connected to the flue ring main there is a negative pressure in the flues making up the fire. This causes the air required for the combustion of the fuel, generally gas or oil, to be drawn through the opened headwall openings behind the one to two chambers which are behind the heating zone and which are still charged with anodes which have already been baked—as a consequence of which that air is pre-heated. Also a considerable amount of air leaks into the flues, the air coming in through the porous walls, the closed burner openings and openings in the headwalls.

In the cooling zone, in order to cool the anodes after baking, air which to a certain extent is also used for combustion is introduced into the flues. This is done generally by means of two fresh air supply manifolds which are mounted on the headwalls either three and five, or three and four, or four and five chambers behind the heating zone. When compressive fans are employed the air escapes through the open burner openings and headwall openings in all chambers in the cooling zone.

The cooling capacity achieved depends greatly on the cross section of the openings through which the air can exit viz, headwall openings and burner openings. When using cooling fans, the excess pressure which may be employed is limited, as otherwise, especially in the vicinity of the fans, the packing powder and the charge will be subject to severe oxidation as a result of too strong a supply of air.

Situating the fresh air supply manifolds on neighboring headwalls e.g. three and four chambers behind the heating zone causes the cooling air to collect in the intermediate chamber as the air blown into the chamber by both manifolds can escape only through the small burner openings, whereas the air which is blown into the neighboring chambers on both sides can also escape through the free openings of the headwall.

There are also disadvantages associated with the arrangement of the fresh air supply manifolds behind the third and fifth chamber after the heating zone i.e. an arrangement with free headwall with free openings, situated between the manifolds. There is, apart from the burner openings, only one single headwall with free openings available for the cooling air to escape from the section between the manifolds; the cooling air from these two neighboring chambers can on the other hand escape through the openings of each appropriate headwall. In any case the chamber between the manifolds is not cooled adequately because there are insufficient openings for the air to escape.

The calcined anodes are removed from the chamber at the end of the cooling zone of a fire, and the empty chamber then reloaded with a charge of non-baked anodes.

By shifting the flue gas exhaust manifold, burners and fresh air supply manifold to a neighboring chamber at predetermined, regular intervals, the fire moves in a cyclic fashion (quasi-continuously) around the furnace.

According to the present state of the art the flue gas exhaust manifold is situated on the headwall, and the chamber immediately in front of the flue gas exhaust manifold functions as the sealing chamber, making it possible to create the necessary negative pressure in the fire in an controlled manner. For proper sealing it is necessary for the sealing chamber to contain charge and packing powder. Additionally the perpendicular opening in the headwall common to the sealing chamber and its immediately adjacent chamber where anodes are loaded or unloaded is sealed off with a sliding baffle. As a result of the negative pressure in the sealing chamber this baffle is pressed against a sealing surface. In order to increase the degree of sealing, the burner openings in the sealing chamber are additionally closed.

The productivity achieved with such a furnace depends on the rate of progress and number of fires and the capacity of the chambers.

SUMMARY OF THE INVENTION

It is a principal object of the present invention to operate a furnace of the type described above such that the rate of production is increased and/or the quality of baked product can be improved.

The production rate can be increased either by a faster rate of progress of the fire or by introducing additional fires. For a given furnace geometry a faster rate of progress of the fire using the mode of operation corresponding to the present state of the art is unsuitable as the quality of product would suffer.

To achieve the foregoing object, the inventors set themselves the task of operating an open ring-type furnace in such a way that the fire was made up of fewer chambers, in particular that the sealing chamber which does not play an active part in the baking cycle is eliminated.

The disadvantageous effect of the sealing chamber as closure of the fire has been known for a long time that is, that in an existing furnace the sealing chamber strongly limits the flexibility needed in the operation of the furnace. In new furnaces it represents a considerable amount of financial investment. In that it lies in the region of maximum negative pressure and, due to the permeability of packing powder and the flue walls, a great deal of air leaks into the flue ring main and thus into the flue gas cleaning units connected up to this.

The foregoing object is achieved by way of the present invention wherein the flue gas exhaust manifold is not mounted on the headwall as was the case up to now but instead on the flues of the chamber of the pre-heating zone next to this headwall. In order not to have any significant, detrimental effect on the function of this chamber to pre-heat the green anodes it contains, it is useful to situate the flue gas exhaust manifold on the flues at most one-third of the chamber length away from the original position on the headwall. It has been shown to be advantageous if the flue gas exhaust manifold is situated in the region between the headwall and the next-lying burner openings in the following pre-heating chamber, denoted here as the first burner openings. It has been found to be particularly advantageous, because it is straightforward to do, to situate the flue gas exhaust manifold directly on the site of the first burner openings. Of course for the flue gas exhaust manifold to function perfectly, the places of the headwall where the flue gas exhaust manifold is normally mounted have to be closed off, and the flues in all chambers opened up at the appropriate places where the flue gas exhaust manifold is to be situated in accordance with the invention and suitably so viz, with an appropriate cross section to accept the part of the flue gas exhaust manifold placed there. For the case that the first burner opening is used for this purpose, the first burner hole bricks are replaced by new flue gas exhaust manifold housing elements with appropriate size of opening. The first burner opening is anyway not normally employed as such. It takes on its function as burner opening only if the direction of progression of the fire is changed. In order that a reversal of fire direction will still be possible, the new element is designed such that it can be exchanged for a burner hole brick or modified to become a burner hole by means of an insert. Therefore, for optimal operation of the furnace, the regions of the flue covers on both sides of each of the headwalls are fitted out with the new flue gas exhaust manifold housing elements.

BRIEF DESCRIPTION OF THE DRAWINGS

Further advantages, features and details of the present invention are revealed in the following description of a preferred exemplified embodiment with the help of the following schematic drawings wherein.

DETAILED DESCRIPTION

Figure 1:
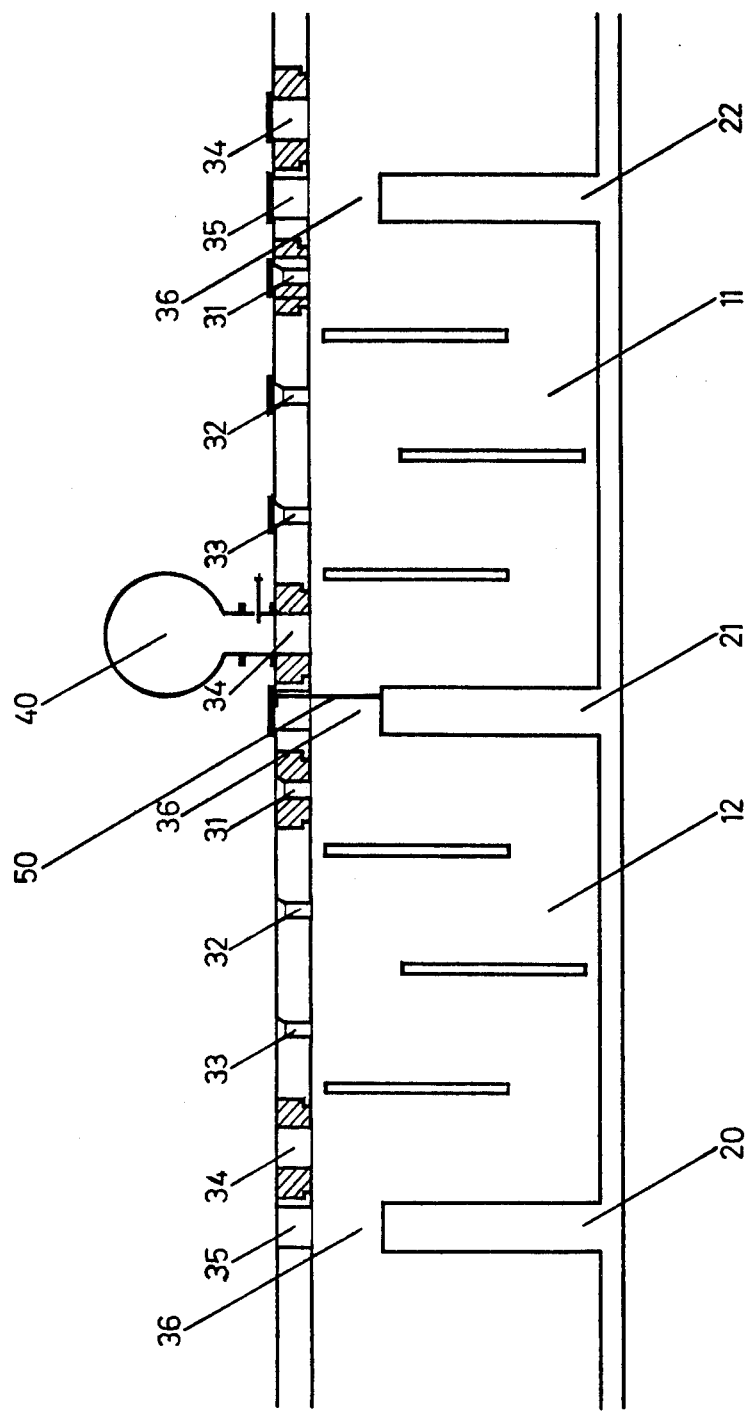
FIG. 1: Is a longitudinal section through a flue above two furnace chambers with flue gas exhaust manifold mounted in place.

FIG. 1 shows a flue comprising region 11 in the first chamber 1 of the fire and region 12 of the first chamber 2 ahead of the fire, regions 11 and 12 being divided off by the headwalls 20,21,22. The flue 11,12, is faced with refractory panels 30 which feature openings 31,32,33 for the burners, a special opening 34 where the flue gas exhaust manifold 40 can be fitted, and openings 35 above the headwalls 20,21 and 22. The through opening 36 in the headwall can be closed off by a sliding baffle 50. According to the invention the flue gas exhaust manifold 40 is mounted on the opening 34.

The new arrangement of the flue gas exhaust manifold 40 offset from the axis of the headwall makes it possible, in order to maintain the negative pressure required in the flues of the fire, to displace the sliding baffle by, compared with the mode of operation according to the present state of the art, a distance of one headwall i.e. to situate it immediately at the start of the first chamber in the preheating stage. The opening 36 in the headwall 21 is then closed off by the sliding baffle. Chamber 1 then serves, in accordance with the present state of the art, as a pre-heating chamber. According to the state of the art chamber 2 would be employed as a sealing chamber and would have to be full of anodes or packing material. According to the invention chamber 2 is not required for the baking sequence i.e. it is no longer necessary to have a sealing chamber and chamber 2, which in the state of the art process is reserved for this, can in the process according to the invention be used for the loading and unloading of the charge.

Using the arrangement according to the present invention the following advantages are obtained:
(a) For each fire one chamber less is required in the furnace.
(b) The considerable quantities of air leaking due to poor sealing by the sealing chamber are eliminated.
(c) Because of the smaller pressure losses, a better flow of flue gas is obtained in the flue gas exhaust manifold 40.

The arrangement of the flue gas exhaust manifold according to the invention brings considerable advantages in the cooling zone of the fire. These are described in the following by way of example and with the help of FIG. 2.

Figure 2:
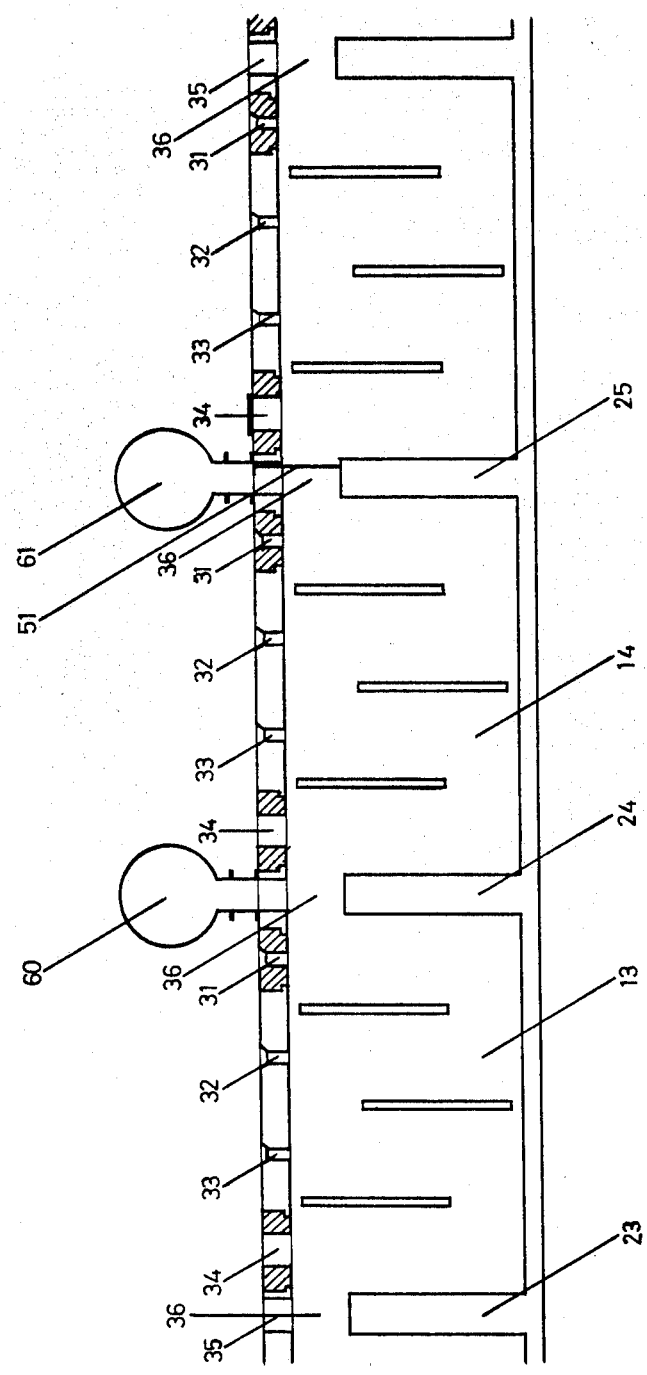
FIG. 2: Is a longitudinal section through a flue above three furnace chambers with fresh air supply manifold mounted in place.

FIG. 2 shows a cross section through a flue region at the end of the fire i.e. at the end of the cooling zone with chambers 3 and 4. Fresh air supply manifolds 60,61 are mounted in the openings 36 at two neighboring headwalls. The opening 36 in the headwall 25 is closed off by the sliding baffle 51. Headwall 25 therefore terminates the fire. By means of the arrangement according to the invention, therefore, an additional opening 34 was created for each flue region the size of which opening corresponds to the size of the insert for the flue gas exhaust manifold; in the cooling zone this opening is used as the air outlet. The direction of flow of the air introduced for cooling is thus fixed. The air flows through the flue areas 13,14 of chambers 3 and 4 lying in front of the respective fresh air supply manifolds 60,61 and leaves these flue areas via the burner openings 31,32,33, outlet 34 and, if desired, when the manifolds do not follow in sequence, via the headwall opening 35. By means of this arrangement it is possible to blow a larger amount of cooling air per unit time through the flues and therefore to achieve more uniform cooling of the charge, because in prior art, the strong current of air is prevented, which is caused by the distributed counterflowing currents from the fresh air supply manifolds when the cooling air is led off exclusively through the burner openings or, if desired, also through the neighboring free headwall openings. Per fire, one chamber less is also required in the cooling zone. The chamber saved can e.g. as with the sealing chamber saved, be used for loading and unloading the anodes.

Operating an open ring-type furnace according to the process of the invention requires therefore 2 chambers less for each fire. This results in the following concrete, economic advantages:

In the case of existing furnaces and depending on the number of chambers of fires available one may either:
(a) introduce an additional fire, or
(b) keeping the same number of fires
achieve better operational flexibility by reducing the number of chambers involved in the baking process or increase the number of chambers in the fire used to heat up the charge.

In a furnace e.g. with two fires, the provision of an additional fire increases productivity by 50%, and in a furnace already with 3 fires an increase of 33%.

Improving the operational flexibility means that for loading and unloading the charge, and/or for repairs and interruptions which either lower the quality of baked anodes or reduce productivity, there are reserve chambers available which have a compensating effect on the operation of the furnace without affecting the rate of progress of the fire.

As a rule, increasing the number of chambers in the heating zone results in a better quality product or, via a slower rate of progress of the fire, leads to an increase in productivity.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

We claim:

1. An open baking furnace for use in manufacturing anodes used in the aluminum electrolytic process comprising:
   a furnace having a flue and a plurality of headwalls wherein one of said headwalls is positioned within said flue for dividing said flue into a first chamber and a second chamber; and
   an exhaust gas manifold mounted on said flue at a distance from said one of said headwalls equal to not more than one-third the length of either said first chamber or said second chamber wherein said exhaust gas manifold is offset from all of said plurality of headwalls.

2. A furnace according to claim 1 wherein said exhaust gas manifold is mounted between said one of said headwalls and the next burner opening in said flue.

3. A furnace according to claim 2 wherein said exhaust gas manifold is positioned equidistant between said one of said headwalls and said next burner opening.

4. A furnace according to claim 1 wherein an exhaust gas manifold is mounted on both sides of said one of said headwalls.

5. A furnace according to claim 4 wherein said exhaust gas manifold mounted on both sides of said one of said headwalls is arranged symmetrically with respect to the longitudinal axis of said one of said headwalls.

6. A furnace according to claim 1 wherein said exhaust gas manifold is mounted in an opening on said flue.

7. A furnace according to claim 6 wherein means are provided for converting said opening in which said exhaust gas manifold is mounted to a burner opening.

8. A process for operating an open baking furnace comprising the steps of:
   providing a flue with a plurality of headwalls wherein one of said headwalls divides said flue into a first chamber and a second chamber;
   providing said first chamber with a plurality of openings positioned along the longitudinal axis of said first chamber;
   locating an exhaust gas manifold at the first of said plurality of openings closest to the one of said headwalls of said chamber such that said exhaust gas manifold is offset from all of said plurality of headwalls; and
   closing off the remaining openings.

9. A process according to claim 8 including the steps of providing an opening over said one of said headwalls for receiving a fresh air supply manifold.

10. A process according to claim 9 including the steps of closing off said opening over said one of said headwalls by means of a sliding baffle.

* * * * *